United States Patent
Hoh et al.

(10) Patent No.: US 6,196,604 B1
(45) Date of Patent: Mar. 6, 2001

(54) EXPANDABLE, REMOVABLE TRAILER ENCLOSURE SUPPORT

(75) Inventors: Raymond Karl Hoh; Lawrence Ralph Parks, both of Galt, CA (US)

(73) Assignee: California Cedar Products, Stockton, CA (US)

( * ) Notice: Subject to any disclaimer, the term of this patent is extended or adjusted under 35 U.S.C. 154(b) by 0 days.

(21) Appl. No.: 09/266,192

(22) Filed: Mar. 10, 1999

(51) Int. Cl.[7] .................................................. B62C 1/06
(52) U.S. Cl. ................................. 296/26.05; 296/26.04; 296/181; 296/183; 296/165; 296/100.05; 296/100.02; 296/102
(58) Field of Search .................... 296/26.04, 26.05, 296/181, 183, 165, 100.05, 100.02, 100.03, 102, 103

(56) References Cited

U.S. PATENT DOCUMENTS

| | | |
|---|---|---|
| 4,103,958 | 8/1978 | Parent . |
| 4,206,943 | 6/1980 | Friedenberg . |
| 4,220,370 * | 9/1980 | Rice ........................................ 296/165 |
| 4,392,682 | 7/1983 | Norkus, Jr. . |
| 4,603,901 | 8/1986 | McIntosh et al. . |
| 4,856,841 * | 8/1989 | Rafi-Zadeh ........................... 296/26 X |
| 4,887,860 | 12/1989 | Dowty . |
| 4,902,065 | 2/1990 | Thralls . |
| 5,114,202 | 5/1992 | Johnson . |
| 5,769,485 * | 6/1998 | Bontrager et al. .................... 296/171 |

* cited by examiner

Primary Examiner—D. Glenn Dayoan
Assistant Examiner—Lori L. Coletta
(74) Attorney, Agent, or Firm—Hogan & Hartson L.L.P.

(57) ABSTRACT

A removable and raisable roof attached to four upright supports is mounted on an open bed trailer. Two supports are located on the left and right corners of the forward edge of the trailer; the other two supports are similarly located at the rear corners of the trailer. No side supports are necessary. Using elevating means within the supports, which can operate independently or in tandem, the front and/or rear portions of the roof can be raised and lowered separately. Using external attachable fixtures and ground mounted supports, each of the roof supports can be lifted from their mounted position on the trailer bed and the trailer driven out from under the supports and roof assembly, converting a covered van to a fully open van. If a fully enclosed trailer is desired, then tarpaulin, or other readily removable wall materials can be suspended from the roof and attached to the trailer bed.

5 Claims, 13 Drawing Sheets

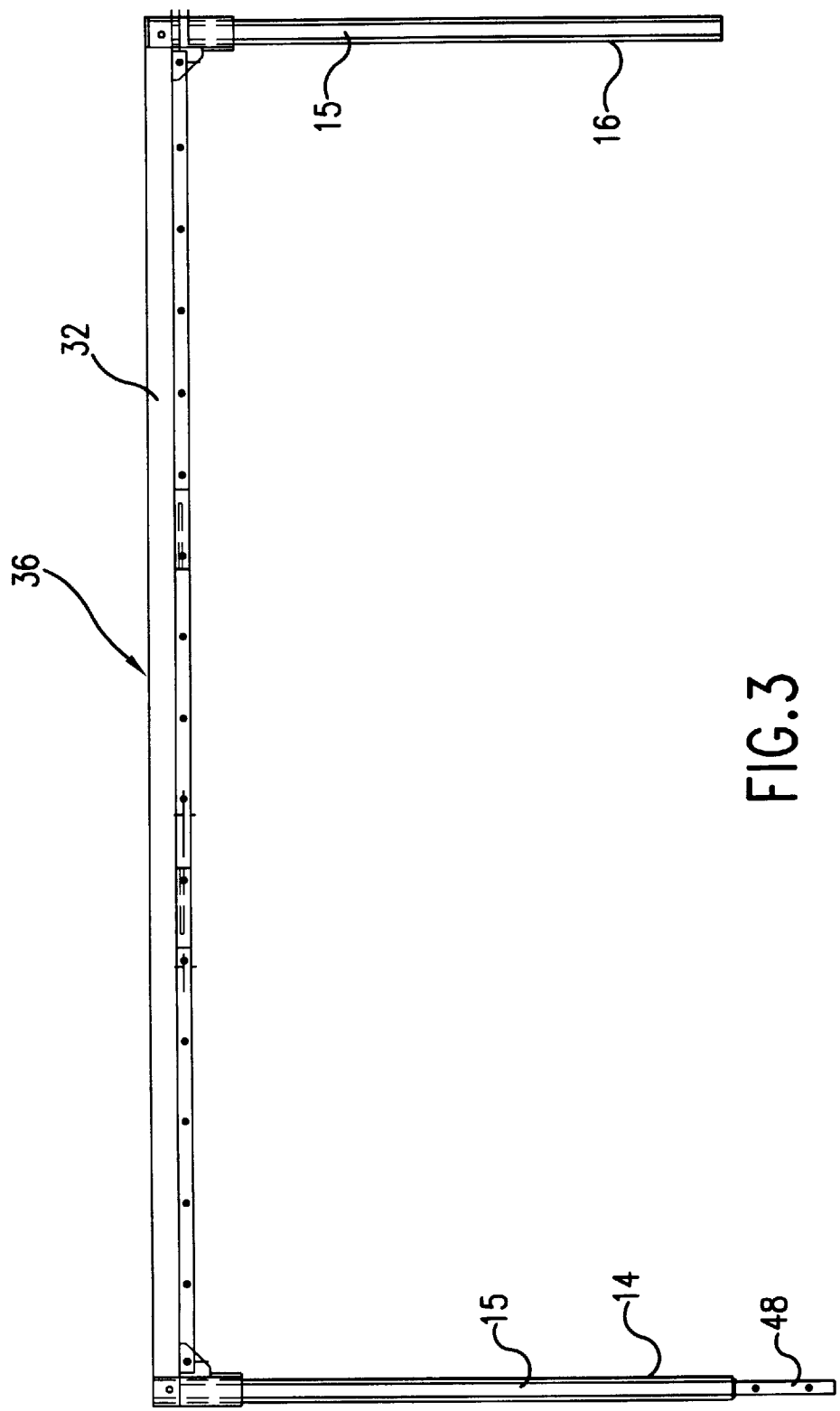

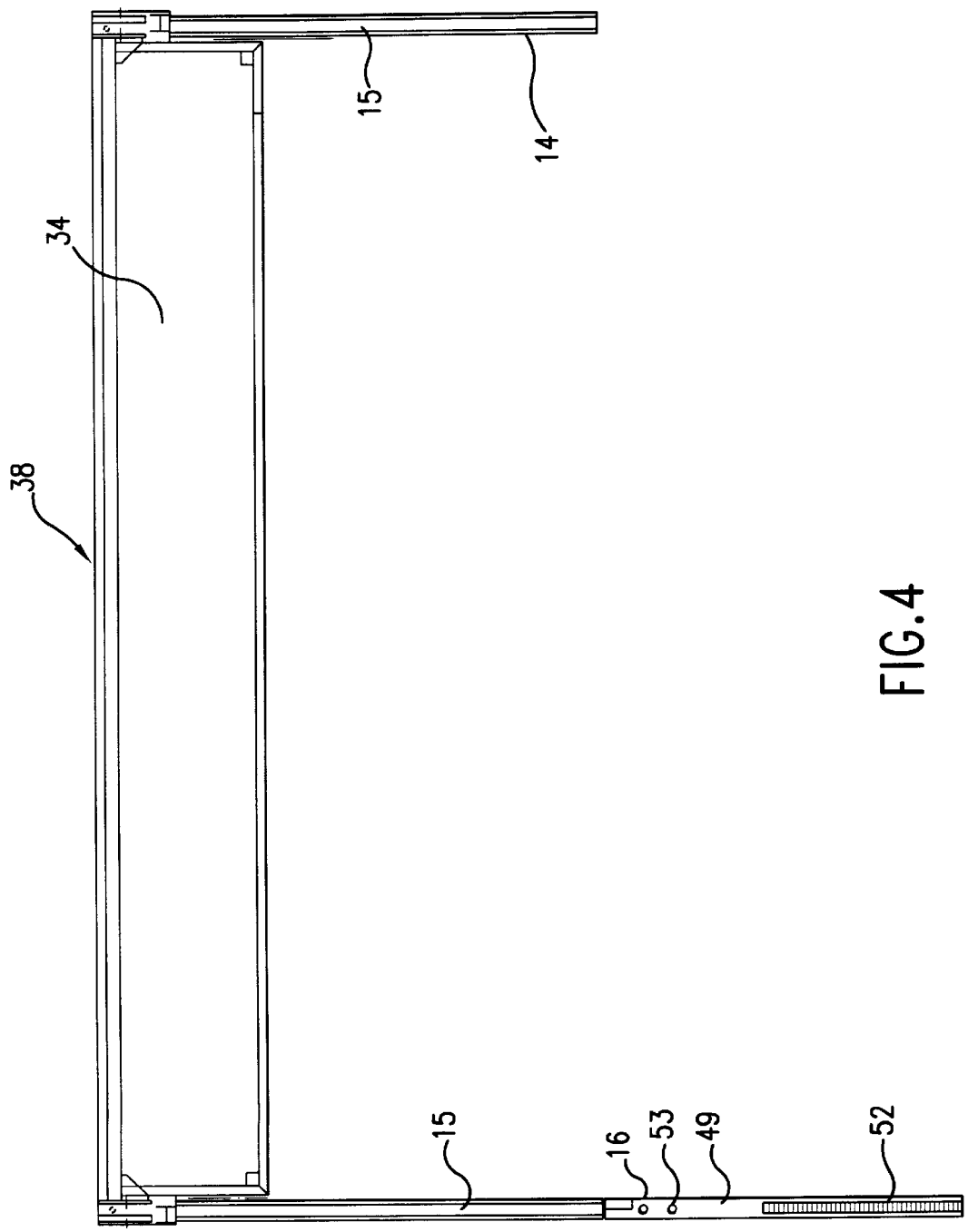

EXPANDABLE, REMOVABLE TRAILER ENCLOSURE SUPPORT

BACKGROUND OF THE INVENTION

The present invention relates to an enclosure for the trailer portion of a flatbed of a truck, trailer or any other vehicle such as a railroad car. In particular, the present invention relates to an enclosure with a readily adjustable height, minimal reduction of the loading width or length of the trailer and the ability to be readily and easily removed to leave an open bed trailer.

AREA OF THE ART

Vehicles used to transport freight may be either open or closed bed. Open bed vehicles, commonly referred to as flatbed vehicles offer the advantage of accommodating a variety of loads and are generally less expensive to produce. Further, the load on the trailer can be accessed from the sides and above as well as from the rear of the vehicle. However, these trailers have a disadvantage in that the load is open to the environment and can be damaged in transit or readily pilfered. Further, since the load is open, often it can only be transported during clear weather. Placing a tarp over the load to protect it from the environment is often not possible because the load is crushable and can not be walked on to place or remove the tarp. Also operators are often injured due to falls while placing the tarp.

An advantage of a closed trailer is the protection and security provided for the load. However, the presence of the enclosure and a fixed height roof on the trailer limits access to the load, makes loading of the trailer more difficult, and results in less usable space for the same size trailer bed width and limits the use of forklifts to load the trailer as the trailer roof interferes with the ability of the forklift operator to adequately lift the load. Further, the mere presence of the walls and roof of the enclosure limits the ability to utilize the full internal width and height of the enclosed trailer without hand stacking. Still further, even though some trailers are stacked by hand to fill the maximum height, it is virtually impossible to take advantage of the maximum allowable 14 foot height with most trailers having a fixed height of 13.5 ft.

In addition, in order to accommodate all types of freight, a carrier must maintain an inventory of both open and closed trailers, thus doubling the inventory of vehicles he must have access to.

The present invention addresses the disadvantages of these different load carriers while retaining the advantages of both the open and closed trailers.

DESCRIPTION OF THE PRIOR ART

Often it is desirable to load a trailer with bulky cargo. Current closed trailers must, of course, be loaded from the rear end of the trailer. Due to the internal height restrictions, the use of a forklift is restricted. In any event, using a forklift it is impossible to fill the entire internal height of the trailer and or to load the cargo to fill the full internal width of the closed trailer without hand stacking. Additionally, the presence of the walls takes up space that could be used for cargo if the walls did not exist. Therefore, it is often desirable, to make best use of space available, to use an open (flatbed) trailer. While highway truckers are limited to the 14 foot height restriction, an open trailer allows the entire width and length of the trailer to be used and provides the opportunity for the cargo to be loaded from the rear as well as from either side to the full 14 foot height. However, this also provides the opportunity for the height of the loaded trailer to exceed the highway 14 foot height restrictions, leaves the cargo open to the elements and subjects the cargo to pilferage and loss during transportation unless covered by a tarpaulin. While this may be alleviated to some extent by covering the load with a tarpaulin cover, the covering process is time consuming, often does not provide the protection desired and creates risk of the driver falling and being injured during placement of the tarpaulin. Further, many soft loads, i.e., food stuff, packaged goods, etc., can not be covered because the weight of the tarpaulin, or the operator walking on the load to place the tarpaulin, can crush and damage the load.

The use of trailer enclosures that are adjustable in height are known. The patent art describes various different designs intended to give this flexibility. For example, U.S. Pat. No. 4,103,958 to Parent describes a bus body of typical construction having fixed side walls defining a lower floor. Mounted thereon is a roof which can be raised to create a second floor passenger area. The movement of the roof is controlled by two pair of interconnected hydraulic cylinders mounted within the fixed walls.

U.S. Pat. No. 4,206,943 to Friedenberg and U.S. Pat. No. 4,392,682 to Norkus both show a lower fixed inner wall and a moveable outer wall. Friedenberg shows guide rods mounted between the inner and outer wall to guide the vertical movement of the outer wall following activation of screw jacks. Norkus has rods on beveled gears, all of which are interconnected, to raise the roof. This construction, while it functions to raise the roof uniformly, significantly reduces the available width of the trailer. Norkus also does not provide the ability for the roof lifting procedure to be provided, alternatively, from either side of the vehicle or to lift only the front or rear roof edge.

U.S. Pat. No. 4,603,901 to Mcintosh shows a conventional pickup truck with an open bed. Jacks are placed in the side walls and a raisable roof is attached to the jacks.

The Dowty U.S. Pat. No. 4,887,860 shows a typical closed trailer construction with ribbed, vertical walls enclosing a series of hollow spaces which include hydraulic or electric jacks to raise or lower the roof.

U.S. Pat. No. 5,114,202 to Johnson is directed to a closed wall trailer that has jacks mounted in the four interior corners to support and raise or lower a moveable roof.

All of the above patents are directed to systems for raising the roof of a closed vehicle in a uniform manner. In all instances the trailer has a fixed lower wall and, in several instances, as a result of the mechanical design, the internal trailer space is narrowed and shortened, reducing the available storage space. Further, all of these designs are permanently installed on to the trailer, are subject to mechanical problems and do not provide the capability of removing the structure to provide an open trailer. Still further, none of these references provides the capability of independent adjusting the height of the front or rear of the trailer so that the height of the roof, even on a sloped trailer, can be 14 foot along the whole trailer length.

Therefore, there is a need for a trailer enclosure which allows the full width and length of the trailer bed to be filled with cargo, allows loading of the cargo from all sides, allows the loading of the cargo to not be restricted by a fixed height roof and provides the capability for cargo to be readily covered and secured without damaging the cargo. Further, it is desirable to provide a roof which can be lifted from either side of the trailer and an enclosure which can be readily removed so that the benefits of an open trailer can be utilized if the cargo is amenable to being carried on an open trailer.

SUMMARY OF THE INVENTION

The invention comprises a panel roof supported by four upright supports for removably mounting on an open bed trailer. Two upright supports are located on the left and right corners (the driver side and passenger side) of the forward edge of the trailer; the other two jacks are similarly located at the rear corners of the trailer. No side walls or end walls are necessary, but may be included if desired. Also, side supports along the length of the trailer are not necessarily required. However, two movable and removable side supports typically are used with the disclosed embodiments in a 50 foot span and one support is used in a 25 to 30 foot span. Using elevating means within the upright supports, which can operate independently or in tandem, the front and/or rear portions of the roof can be raised and lowered separately. Further, using external attachable fixtures and ground mounted supports, each of the upright supports can be lifted from its mounted position on the trailer bed and the trailer driven out from under the removable enclosure or the roof structure rolled off the trailer bed, converting a covered van to a fully open flatbed trailer. While a fully enclosed trailer is desired, moveable tarpaulin, or other readily removable wall materials can be suspended from the roof and attached to the trailer bed or the sides can be left open and front and rear wall panels can be hinged from the upright supports or hung from the roof front and rear rails.

DESCRIPTION OF THE FIGURES

These and other features, aspects and advantages of the present invention will become better understood with reference to the following description, appended claims, and accompanying drawings, where:

FIG. 3 is a view of the rear end of the upper portion of the removable trailer top embodying features of the invention.

FIG. 4 is a front view of the front end upper portion of the of the removable trailer top embodying features of the invention.

DETAILED DESCRIPTION OF THE INVENTION

Figure 1:
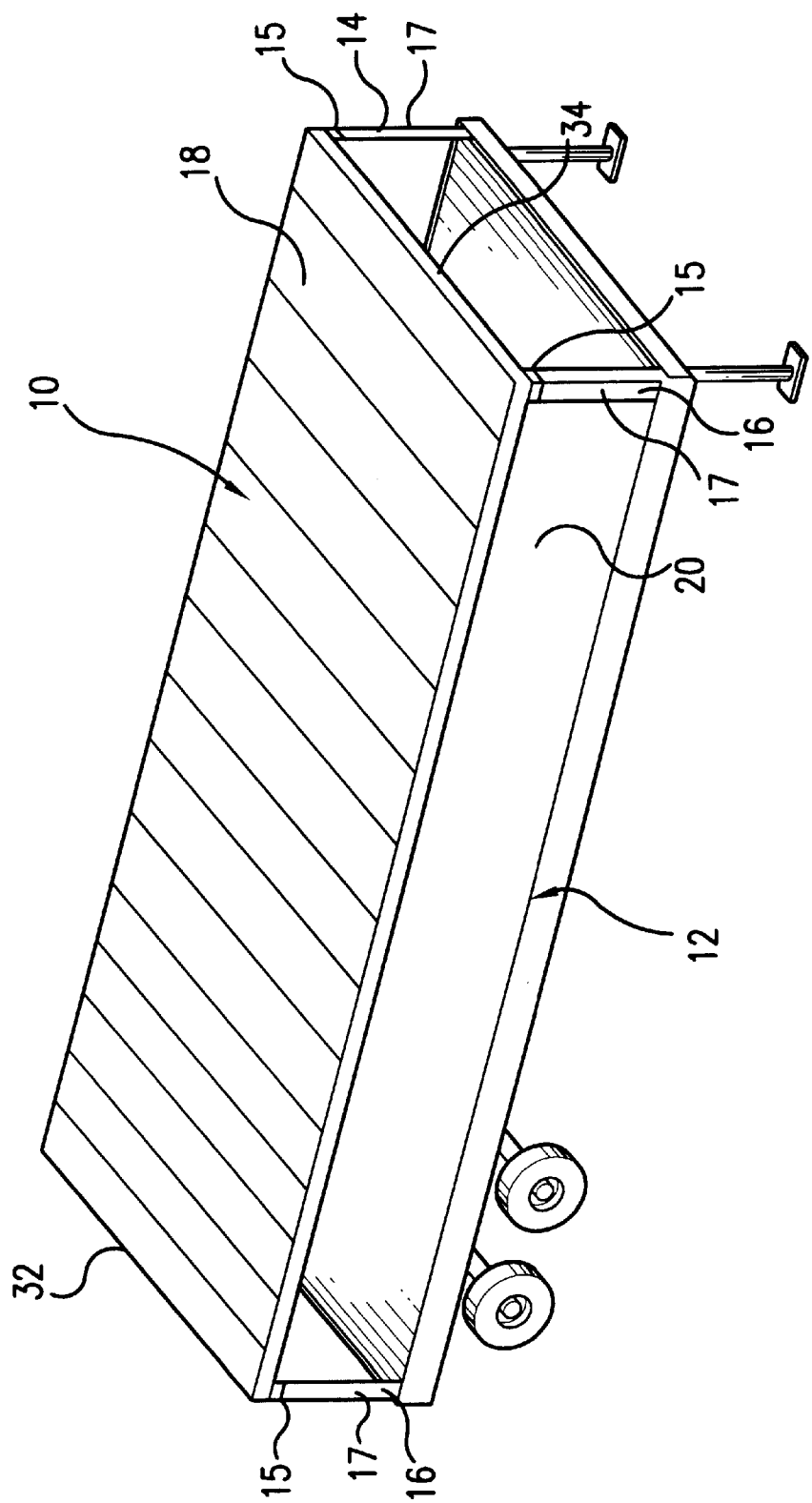
FIG. 1 is a perspective side view of a removable, expandable trailer top embodying features of the invention mounted on a trailer.

A removable, expandable trailer enclosure 10 embodying features of the invention is shown in FIGS. 1–18, FIG. 1 showing the trailer enclosure 10 mounted on an open trailer 12. The expandable trailer enclosure 10 comprises four extendable upright supports, consisting of two driver side supports 14 and two passenger side supports 16, which may be the same or different as discussed below, and a roof 18 resting on upper telescoping portions 15 within the upright supports 14, 16 in a manner that allows the distance between the roof 18 and the trailer bed 20 to be readily increased or decreased as desired. The lower end of the lower portion 17 of the side supports 14, 16 have means 224 thereon to allow those side supports to be removably attached to the edge of the trailer bed 20. The telescoping upper portions 15 in the upper ends of the rear driver side upright support 14 and the rear passenger upright support 16 are connected by a rear cross arm 32, best shown in FIG. 3, the two rear upright supports and rear cross arm constituting the rear support assembly 36. Likewise, the upper ends of the telescoping portions within the forward driver side upright support 14 and the forward passenger upright support 16 are connected by a forward or front cross arm 34, best shown in FIG. 4, the two forward upright supports and forward cross arm constituting the forward support assembly 38.

Figure 2:
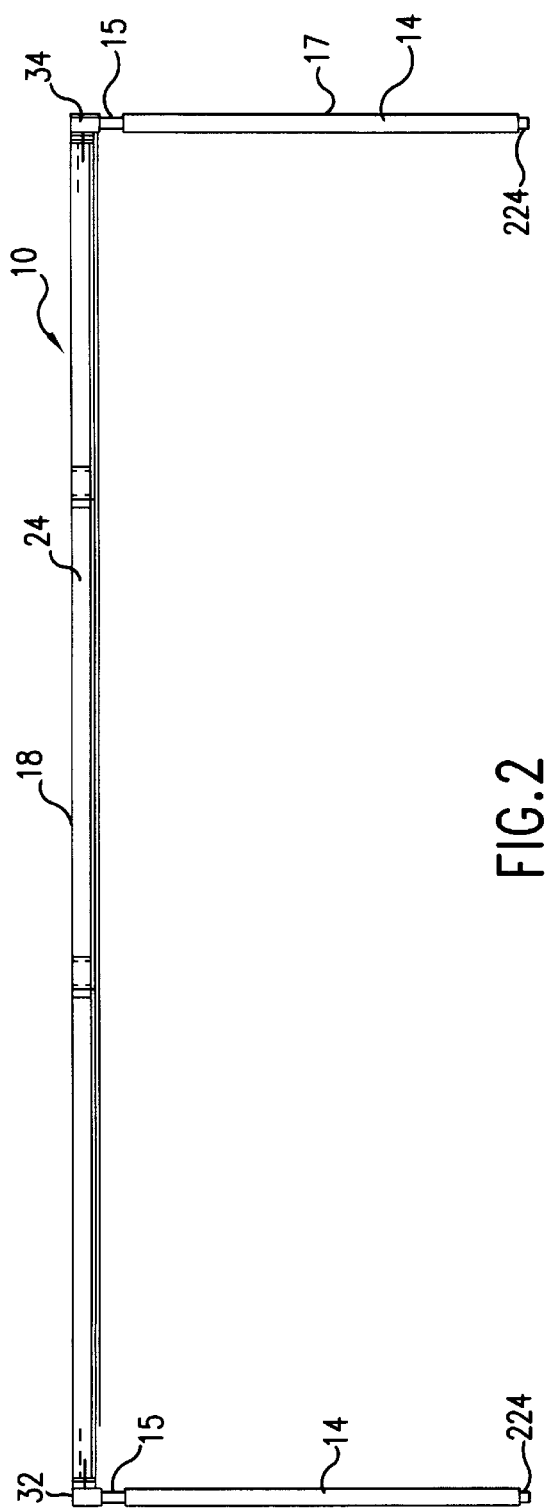
FIG. 2 is a side view of the upper portion of the removable trailer top embodying features of the invention.

FIG. 2 is a driver side view of the removable, expandable trailer enclosure 10 showing the two driver side upright supports 14 and the driver side edge 24 of the roof 18. However, the passenger side view is identical.

Figure 5:
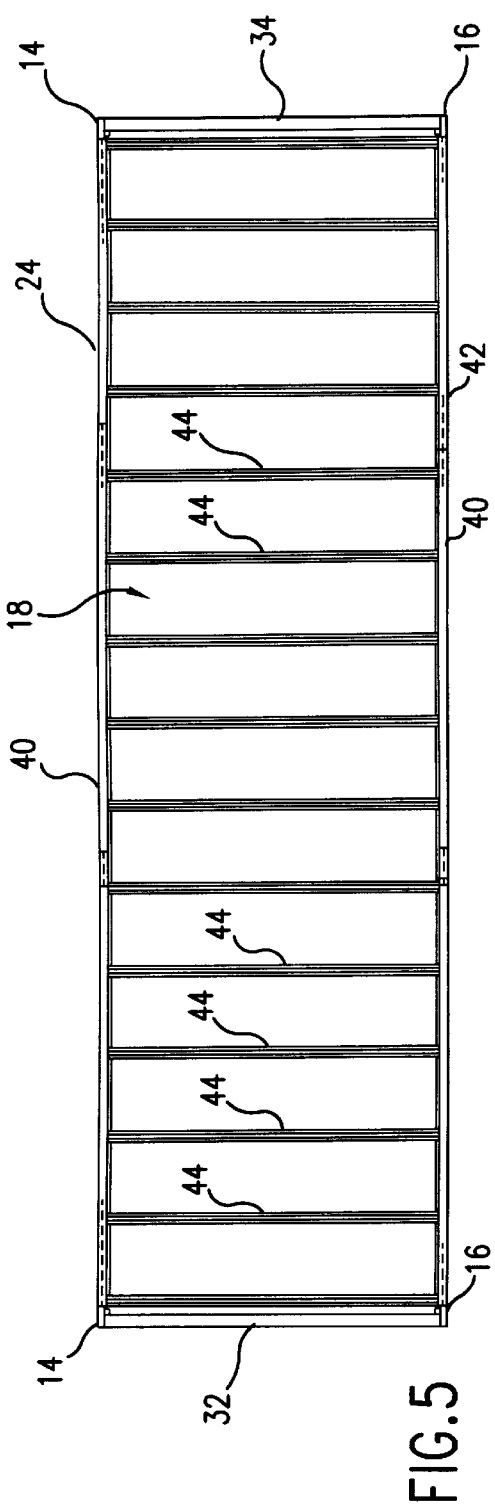
FIG. 5 is a view of the top of the removable trailer top embodying features of the invention.

The roof 18, shown in FIG. 5, comprises a rectangular frame with support beams 40 running along driver side edge 24 and passenger side edge 42 and a series of cross supports 44 to support a roof. The roof can be composed of any desired material, including tarpaulin, metals, such as aluminum or steel, fiberglass composites, including light transmitting materials so the interior of the trailer isn't dark, or other common trailer enclosure materials. In the construction shown in FIG. 5, the roof material is not applied. However, it can be panels or a continuous cover such as 8 ft. wide, trailer length, clear fiberglass, aluminum or tarpaulin cover rolled onto the top. The roof is generally supported by only the four upright supports 14, 16 which are located at opposite ends of the trailer enclosure. Therefore, the support beams 40 should have sufficient structural strength to span the distance between the front and rear supports 14, 16 without an unacceptable sag along the length of the trailer. However, removable uprights, not shown, can be placed along the length to provide additional support.

Figures 6, 7:
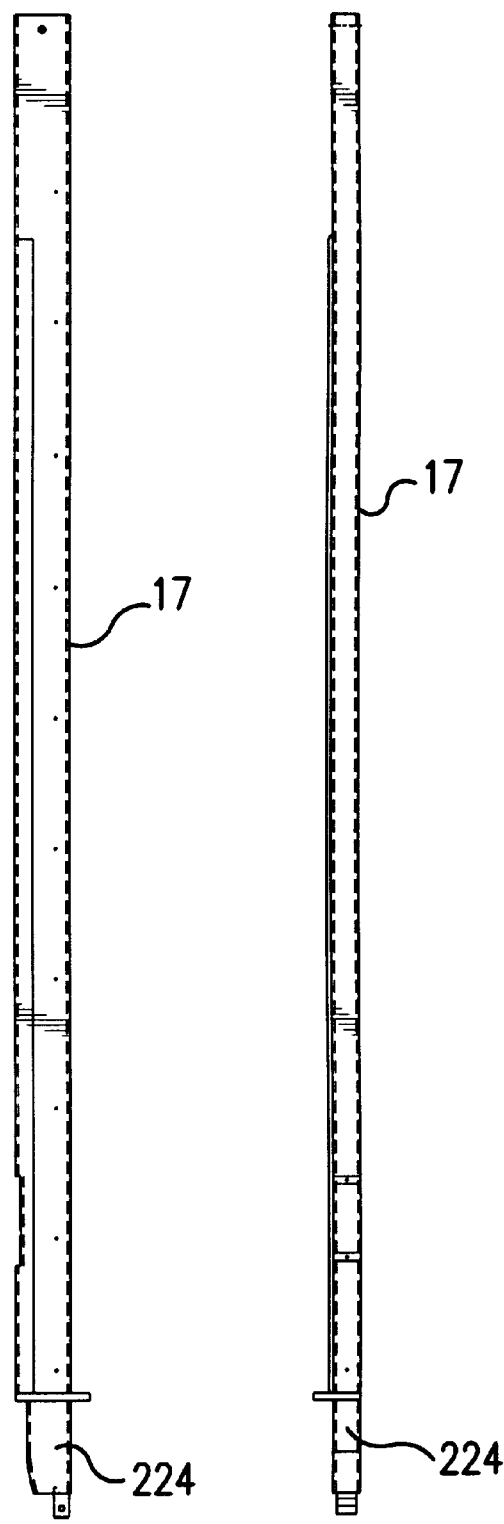
FIG. 6 is a side view of the lower portion of one of the upright supports of the removable trailer top shown in FIG. 2.
FIG. 7 is a front view of the lower portion of the upright support show in FIG. 6.

Each of the upright supports 14, 16 has a hollow lower portion 17 and contains therein a telescoping upper portion 15 and a lifting mechanism which functions to raise the roof 18 attached thereto. FIGS. 6 and 7 are side and front views, respectively, of the lower portion of the side supports 14, 16.

Figure 18:
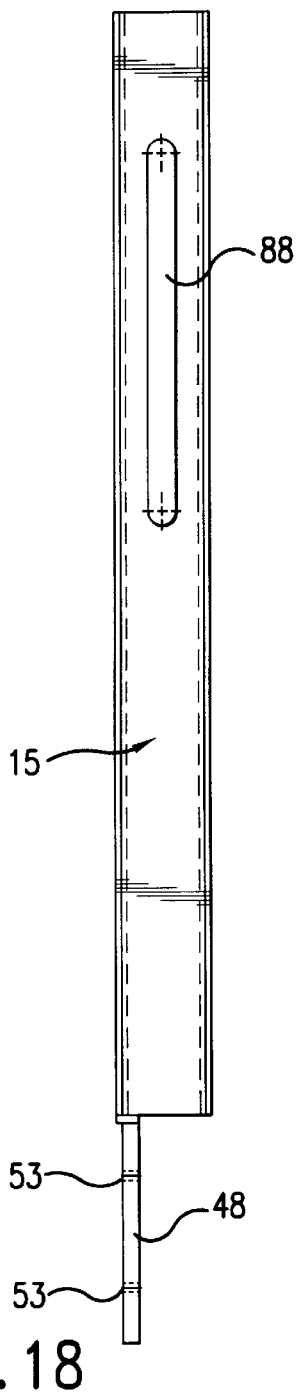
FIG. 18 is a side view of the upper portion of the side support.
Figure 8:
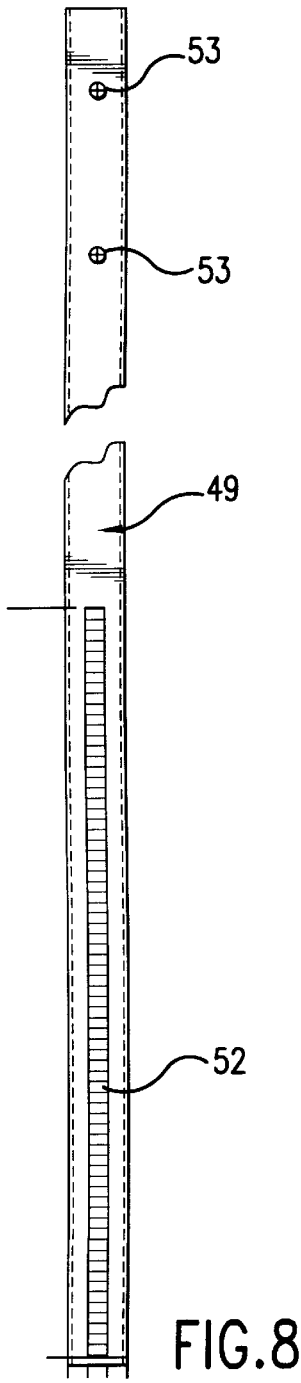
FIG. 8 is an enlarged front view of the ratchet extension arm.

FIGS. 3 and 4 show rear and front views respectively of the upper portion 15 of the driver side upright supports 14. FIGS. 6 and 7 are representative of the lower portion 17 of the uprights which enclose the lower end of the telescoping upper portions 15. The supports 14, 16 shown in FIGS. 3 and 4 differ in that only the driver side supports 14 in FIG. 3 it is shown to have an extension 48 on its lower end for attachment of a rack 52. The passenger side uprights 16 may also have the extensions 48 attached thereto. For clarity, FIG. 3 shows the extension 48 without the rack 52 attached and FIG. 4 shows the additional piece 49 with rack 52 attached to the attachment 48 on the passenger side. FIG. 8 is an enlarged view of the additional piece 44 with rack 52 and FIG. 18 is an enlarged view of the upper portion 15. The holes 53 allow for attachment of the additional piece 49 to the extension 48 on the upper portion 15. A longitudinal slot through the wall of the upper portion 15, shown in FIG. 18, receives a bolt or pin 104 mounted in the top end of the lower portion 17, best shown in FIG. 9, to prevent the upper portion from being raised or lowered too far.

Each upright support 14, 16 encloses a lifting assembly 28 for use by an operator, using various different drive mechanisms, to raise the upper portion 15. The rear upright supports 14, 16 provide a connection which passes through the rear cross arm 32 so that activation of the lifting assembly 28 in the driver side rear upright 14 to raise that portion of the roof 18 attached thereto will cause the like portion on the trailer top in the passenger side rear upright 16 to move upward by the same distance, also raising that portion of the roof 18 attached thereto. As a result, it is necessary to only activate the lifting assembly 28, which may be located in either the driver side or the passenger side upright support 14, 16, to cause the rear portion of the roof 18 to raise in a manner parallel to the trailer bed 20. In a similar manner, the lifting assembly 28 in the front uprights 14, 16 are interconnected through the forward cross arm 34 so that activation of one of the forward lifting assembly 28 will cause the forward edge of the roof 18 to raise uniformly.

Figure 9:
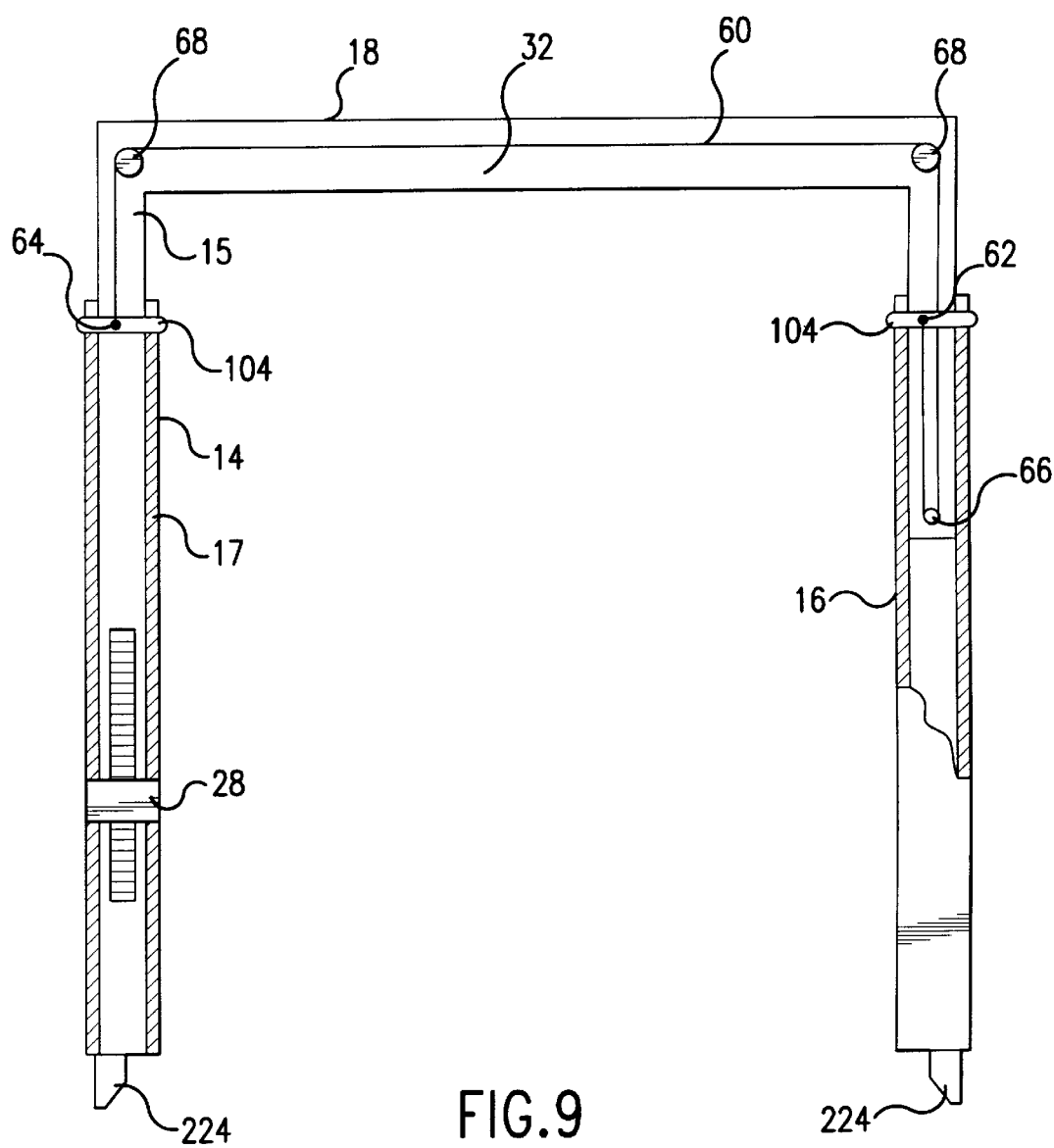
FIG. 9 is a partially cut away schematic view of a first version of the internal drive structure in the front end or the rear end of the removable expandable trailer top.

In order to raise the pair of rear or forward supports 14, 16 uniformly, the internal mechanism therein is interconnected by drive means passing through the forward or rear cross arms 34, 36. FIG. 9 shows a cable interconnect while FIG. 11, described below, shows a cross shaft 222 with bevel gears 220 on each end. The cable interconnect uses a cable 60 attached at a first end 62 to the pin 104 through the lower portion 17 and the slot 88 in the upper portion 15 on the passenger's side and at its second end 64, to the pin through the lower tube 17 and slot 88 in the upper portion 15 on the driver's side. The cable 60 on the passenger side then passes around a lower pulley 66 in the lower end of upper portion 15 of the passenger side upright support 14, 16 and over two upper pulleys 68 within the space near the juncture of the uprights 14, 16 and the cross arm 34, 36. As a result, when the passenger side support upper portion 15 is driven upwards, the drivers side support upper portion 15 is pulled upwards. Of course, the arrangement could be reversed with the lower pulley located in the drivers side upright support 14, 16 or two complementary sets of cables 60 (one for a driver side drive mechanism and one for a passenger side drive mechanism) can be used so that a lifting assembly 28 on either upright can be used to lift from either side, or both sides simultaneously.

Figure 10A:
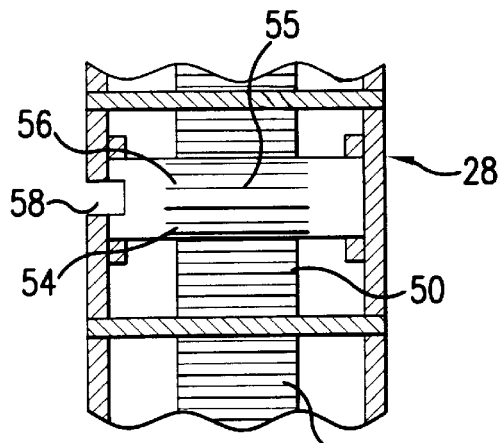
FIGS. 10a–10e are partially cut away views of four different drive mechanisms for raising the upright with rack as shown in FIG. 8.
Figure 10B:
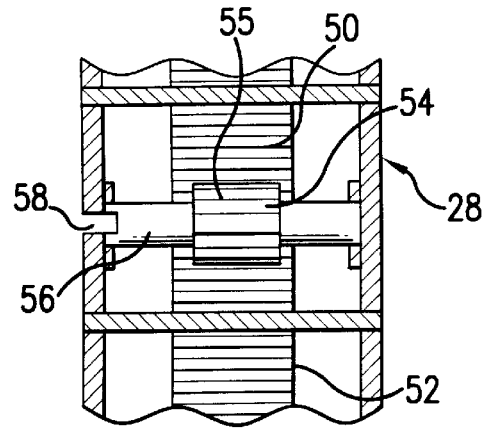
Figure 10C:
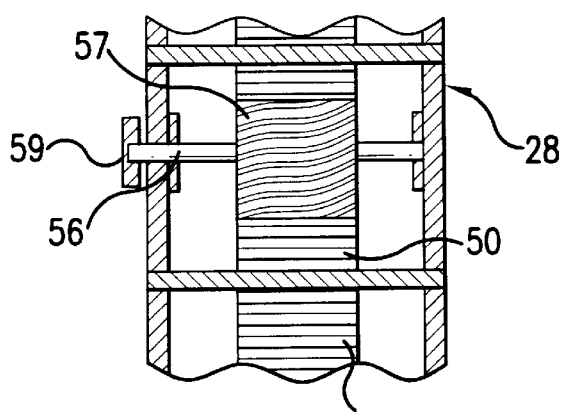
Figure 10D:
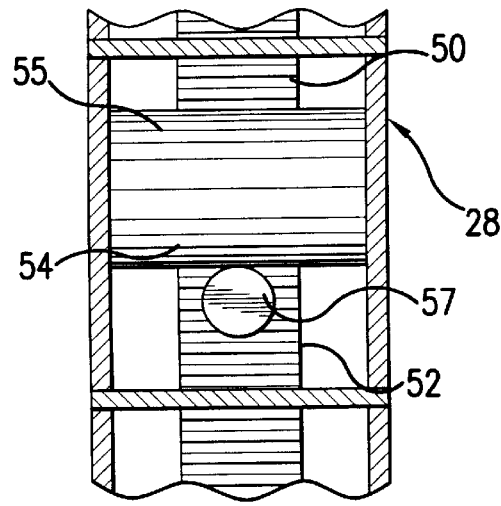
Figure 10E:
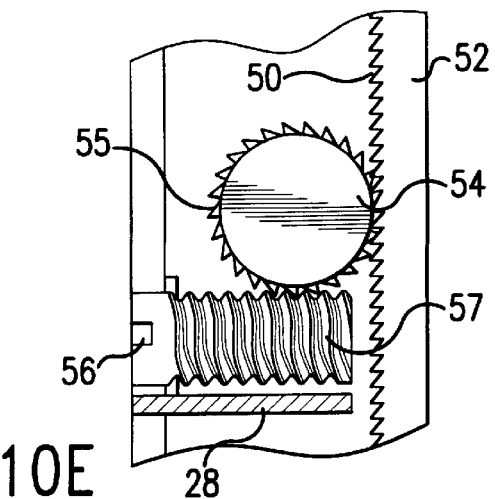

While FIG. 9 shows the lifting assembly 28 as a box mounted on the lower portion 17 of the driver side upright 14, FIGS. 10a–e illustrate several variations of lifting mechanism enclosed within said box. However, these alternative lifting mechanisms are merely representative and are not meant to limit the various different means which may be used to lift the upper portion 15 and hold the raised upper portion at a desired position. Also while various gear combinations are shown, it is contemplated that other means, such as a pneumatic system can be used. FIGS. 10a–e show a cutaway view of a portion of a lifting assembly 28 with a rack 52 having a series of parallel notches 50 arranged and equally spaced along a lower end of the additional piece 49 applied to the upper portion 15. These notches 50 are engaged, as shown in FIGS. 10a and 10b, with teeth 55 on a spline gear 54. This is commonly referred to as a rack and pinion arrangement. Rotation of the spline gear 54 lifts or lowers the upper portion 15 which in turn raises the roof 18. FIG. 10c shows a worm gear 57. FIGS. 10d and 10e show a front and side view respectively of a worm gear, spur gear and rack operating in conjunction. The lifting assembly 28 incorporating the rack, as shown in FIGS. 10a–10e, is driven by a removable and attachable rotary drive, such as an electric drill or a hand crank inserted into the end 58 of the shaft 56 attached to the gear 54, 57 portion of the rack and gear arrangement. Alternatively, a female socket can be placed on a matching non-round exposed end 59 of the shaft. Upon activating the drill, the rotating socket or inserted bit causes the gear 54 to rotate driving the lifting assembly 28 upwards. Not shown is a releasable locking mechanism which may be required to hold the upper portion in the extended position until it is released, or a system to prevent rapid lowering of the roof once the locking mechanism is released and the lifting assembly 28 is allowed to lower or causes lowering by driving the gear in the opposite direction. Generally, because of a high mechanical advantage, the worm gear arrangement does not need the lock as it is self breaking.

Figure 11:
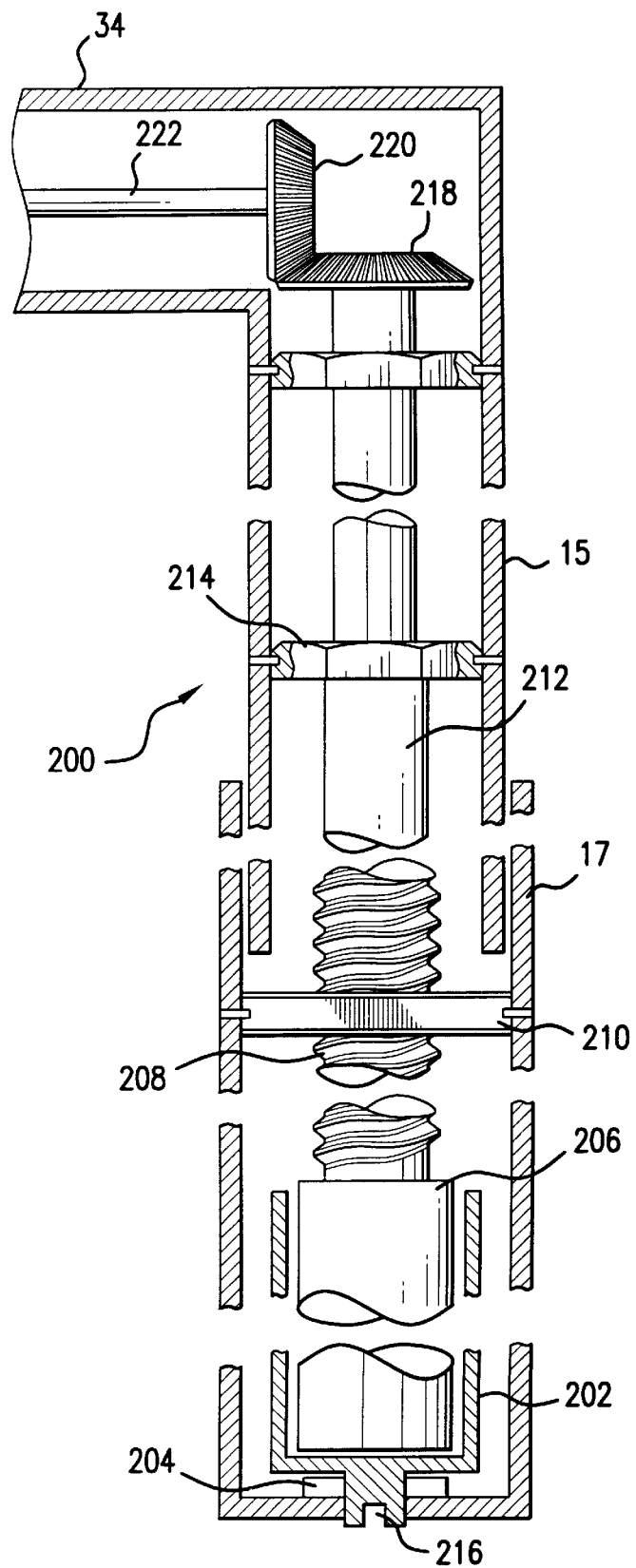
FIG. 11 is a schematic cut away view, broken into several sections, of a second version of an internal drive structure in the front or the rear end of the removable expandable trailer top.

Another lifting mechanism is shown in FIG. 11. This threaded shaft mechanism 200, all enclosed with the upright 14, 16 comprises a) an outer non-round (i.e., square) tube 202 which can be rotated in bearings 204 but which is fixed from vertical movement, b) a smaller cross section non-round (i.e., square) tube or rod 206 within the outer tube 202, said small tube or rod 206 being free to rise upward within the outer non-round tube 202, c) a threaded rod portion 208 affixed to the top of the smaller, inner tube 206 and d) a nut 210 with threads mating with the threaded rod 208, the nut 210 fixed in location within the upper end of the lower portion 17 of the upright 14, 16. The upper portion of the threaded rod 212, i.e., the portion above the nut when the lifting mechanism is in its lowest position, is not required to be threaded. The upper end 212 of the threaded rod 208 is rotationally mounted to the upper end of the upper tube 15 through a thrust bearing 214 near the lower end of that upper tube 15. When the outer non-round tube 202 is rotated, for example by placing a socket wrench into a matching socket 216 in the bottom end of the outer tube 202 and applying a rotational force, the threaded rod 208 rotates in the nut 210 and, depending on the direction of rotation, causes the upper portion 15 supported by the thrust bearing 214 to raise or lower. Mounted on the uppermost end of the threaded rod 212 is a bevel gear 218. This bevel gear 218 meshes with a second bevel gear 220 on one end of a cross shaft 222 which runs through and across the cross arm 34. The above described structure is duplicated in the other upright of the paired upright 14, 16. As a result, applying a rotation force to the socket 216 in the bottom of either outer non-round tube 202 not only causes that side of the trailer enclosure to lift but also applies a lifting force to the paired upright connected thereto.

FIG. 11 shows a rotating vertical shaft which is driven in a rotational manner at its lower end. This causes the support upper portion 15 to raise and the bevel gear on the top to rotate. As the top half of the shaft rotates and raises, the bevel gear at the top causes a matching bevel gear to rotate, driving a cross shaft and, in turn the paired vertical shaft to also rotate, lifting the other support upper portion.

While lifting mechanisms have been described for the rear support assembly 36 the same mechanism can be used in the front support assembly 34.

Another unique feature of the expandable enclosure 10 is that it can be readily removed from the trailer bed 20 by lifting the rear and forward support assembly 36, 38 so that the foot 224 on the bottom of the upright supports 14, 16 are removed from their locations in the trailer bed 20. The trailer 12 can then be driven out from under the enclosure 10 to provide an open trailer. Alternatively, if the removal mechanism attached to each upright support 14, 16 includes a wheeled base 76, the enclosure 10 can be wheeled away from the trailer 20. One means of accomplishing the lifting of the enclosure 10 is to use a bracket 74, such as shown in FIGS. 12–13 connected to a wheeled base 76, such as shown in FIGS. 14 and 15, resulting in the wheeled expandable enclosure assembly 78 as shown in FIG. 16.

Figure 12:
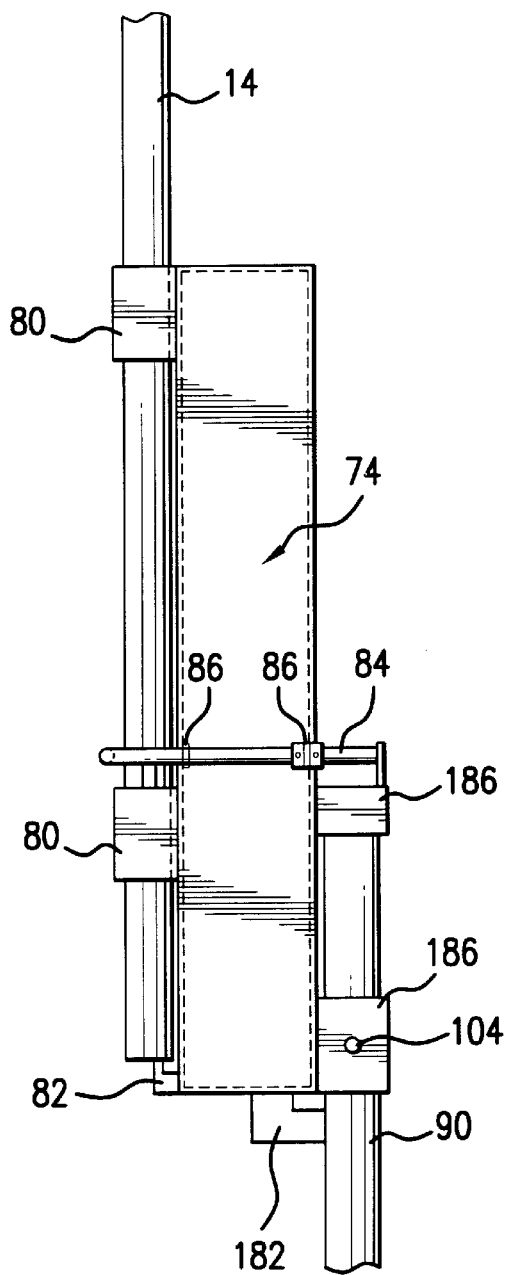
FIG. 12 is a front view of a lifting fixture attached to one of the upright supports.
Figure 13:
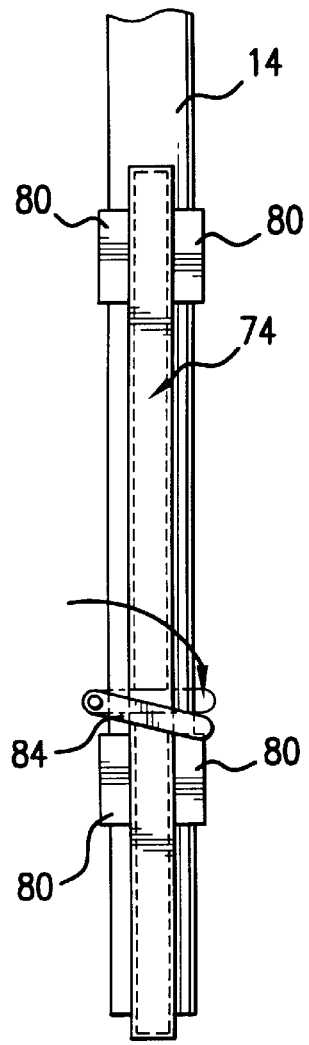
FIG. 13 is a side view of the lifting fixture of FIG. 12 attached to one of the upright supports.

Referring to FIGS. 12–13, a lifting bracket 74 is shown removably attached to an upright support 14, 16 by use of two side extensions 80 placed around the sides of the upright support 14 and a hook 82 placed in the base of the upright 14, 16. Once the bracket 74 is brought against the upright 14, 16, the locking arm 84, which is held to the bracket 74 by the collars 86, is rotated in the direction of the arrow in FIG. 13, trapping the upright 14 against the bracket 74 and between the side extensions 80. If necessary, a pin, not shown, can be placed through the bracket 74 or the extensions 80 in the upright 14, 16.

Figure 14:
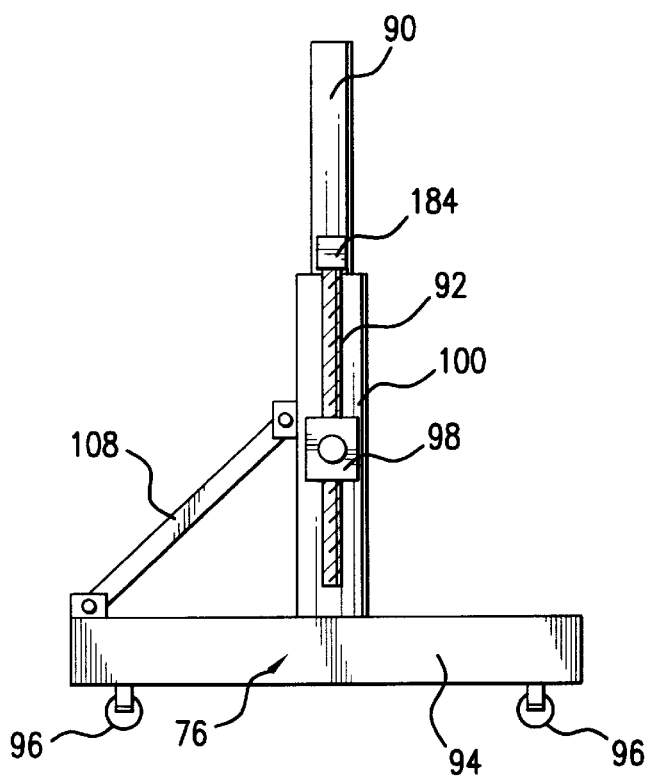
FIG. 14 is a front view of a wheeled base for use with the lifting fixture of FIGS. 12–13 in removal of the expandable trailer top from a trailer.
Figure 15:
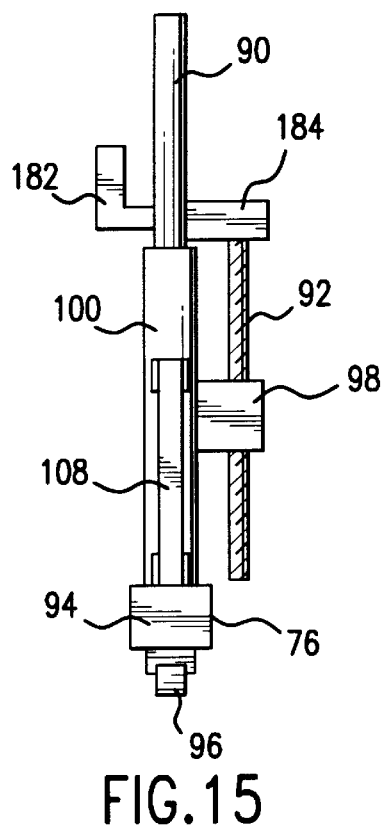
FIG. 15 is a side view of the wheeled base of FIG. 14.
Figure 16:
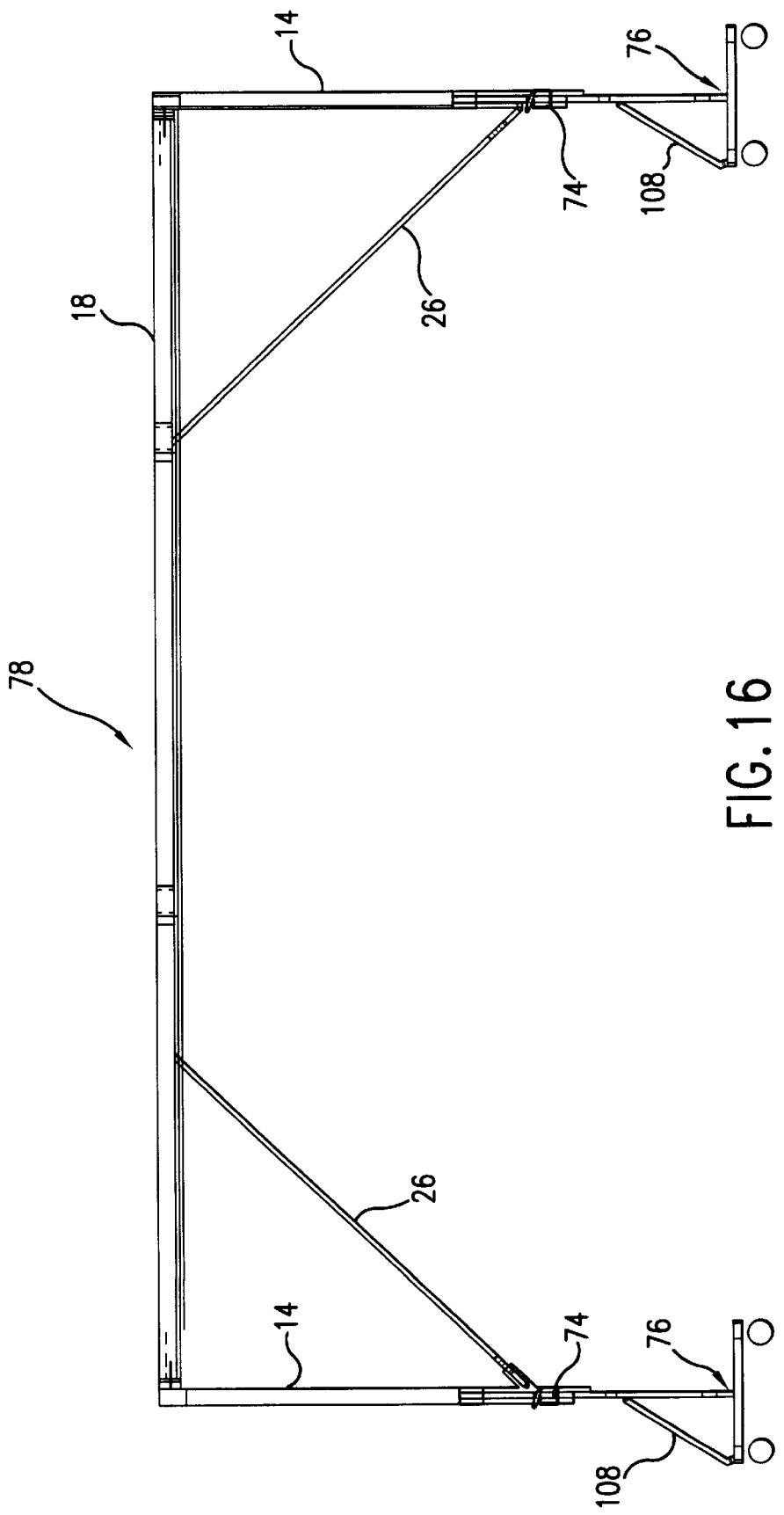
FIG. 16 is a side view of the expandable trailer top of FIG. 2 mounted on the wheeled base of FIG. 14 following removal from a trailer.

FIGS. 14 and 15 show the wheeled base 76 which includes a vertical lower tube 100 mounted on a base 94 carried by wheels 96 and supported by a diagonal brace 108. A lifting cylinder 90, moveably mounted in the lower tube 100, has a jack hook 182 extending in one direction and lifting plate 184 extending in the opposite direction. Mounted to the outer face of the lower tube 100 is a jack assembly 98 which, in the embodiment shown, has a threaded shaft 92 passing through jack assembly 98 with the top of the threaded shaft 92 resting against the bottom of the lifting plate 184.

In use, the wheeled base 76 is rolled up to the bracket 74 and the lifting cylinder 90 is placed in to the front extensions 186 and locked in place using a pin 104 with the jack hook 182 in the bottom of the bracket 74.

To lift the enclosure, four brackets 74 and four wheeled bases 76 are required. Four braces 26 are mounted at a first end to the roof edge 24 and a second end to a lifting bracket attached to each upright 14, 16. The brackets 74 are attached, one to each upright support 14, 16. Using four wheeled bases 76, one attached to each upright support 14, 16, through use of the brackets 74 the lifting cylinder 90 in each wheeled base is elevated, thus raising the enclosure 10 and lifting the foot 224 out of the receiving opening in the trailer bed 20. Once sufficiently elevated the trailer can be moved from under the enclosure or the enclosure can be rolled away from the trailer. The wheeled expandable enclosure assembly 78 after removal from the trailer is shown in FIG. 16. The triangular brace 26 aids in maintaining the structural shape of the enclosure once removed from the truck bed. Similar triangular supports may also be added to each end of the enclosure.

Various different mechanisms may be used to elevate or lower the lifting cylinder 90 in the wheeled base 76. For example, a lifting mechanism as described above used in the upright supports 14, 16 can be used. A preferred mechanism is a worm gear arrangement, such as used in a boat jack, a hydraulic system or a scissor mechanism similar to that used in a typical automotive jack.

The above described trailer enclosure is suitable for attachment to a broad range of open bed or open top vehicles. The roof of the enclosure is typically 13'6" to 14 foot in height. Each of the upper portion 15, which rests within the lower portion in the telescoping manner, and the lower portion 17, are about 100–120 inches long. The roof can generally be raised about 18 additional inches, but usually from about 12 to 24 inches. However, the possible elevation of the roof is limited only by the mechanical travel of the upper portion 15 in the upright supports 14, 16. Depending on the nature of the cargo and the method of loading, the roof can be raised temporarily during the loading process to provide more usable area during the loading process. The roof can then be maintained at its elevated position or lowered down to normal height (fourteen feet) during transport of the load. Alternatively, the front or rear of the roof can be independently lowered if such configuration is of benefit. Further, in the case of a compressible load, or a desire to add restraints to movement of the cargo, the cargo can be loaded to a height within the now covered trailer greater than normal and the roof then lowered to contact and, if desired, to compress the load to prevent the load from moving. Because of the materials used to construct the moveable enclosure, the total weight of the enclosure is significantly reduced when compared with non-moveable enclosures which it replaces. For example, a typical moveable enclosure embodying features of the invention weighs about 1500 pounds while a fixed enclosure typically weighs about 3000 pounds. The weight of a fully loaded trailer is generally capped at 80,000 pounds. By using the described moveable trailer enclosure, the cargo weight can be increased by 1500 pounds without exceeding load weight limits.

If it is desired to fully enclose the load, curtains or panels can be attached to the roof at the sides and ends of the trailer Adding tarpaulins to cover a load is a common practice on open cargo loads. The presence of a solid roof and sturdy end supports makes this practice easier to accomplish and results in a more secure load.

Still further to assure that the legal maximum 14 foot height is not exceeded, fixed length side, front and rear curtains can be provided which cooperate with the moveable roof to provide a high visibility indication if the roof remains elevated above the trailer bed so as to exceed the 14 foot maximum. For example, the end curtains can be attached to the uprights 14, 16 so as to leave a visible space between the curtain top and roof edge if the roof is too high. Alternatively, the curtains can be moveably hung from the roof top so that a space remains between the curtain bottom and trailer bed when the 14 foot allowance is exceeded.

Figure 17:
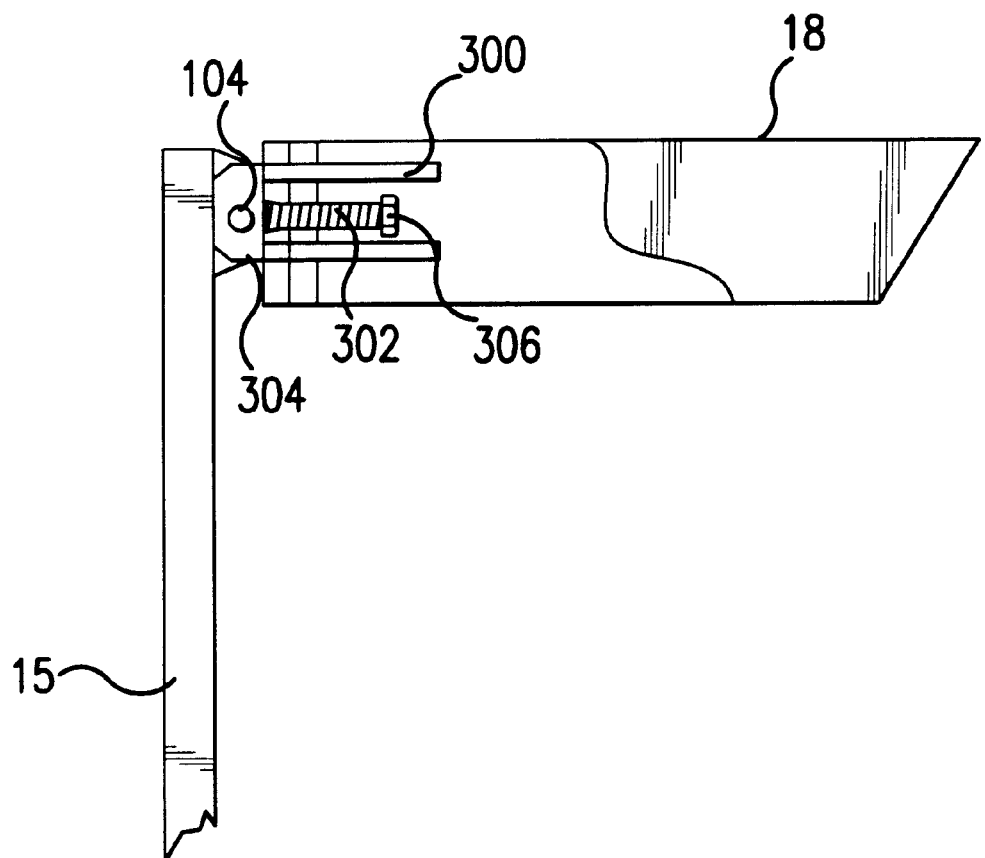
FIG. 17 is a partial side view of the expandable joint between an upright support and the roof.

Another feature of the enclosure is that the roof, while attached to the uprights, is attached on a sliding structure so that movement of the components of the trailer top or elevation of one end of the roof will not cause the uprights on the other end to be placed under stress by a rigid connection. This is best shown in FIG. 17 which shows the floating construction of the connection of one of the uprights to roof.

Attached to the upper portion 15 by pin 104 is a mounting bracket 304 having two horizontal rods 300 and a threaded rod 302 which are inserted into matching holes in the end of the roof, side edge 24, 42 sized to receive the two rods 300 and the threaded rod 302. A nut 306 is placed on the end of the threaded rod 302 to keep the roof from disconnecting itself from the attachment to the upper portion 15. Use of the pin mounting allows the mounting bracket 304 to pivot and the roof to slide along the rods 300, 302 as the other end of the roof is raised or lowered. In this manner, one end of the enclosure can be raised, for example, 18 inches. If not for the sliding arrangement described, considerable stress could be placed on the uprights on the other end of the trailer.

Although the present invention has been described in considerable detail with reference to certain preferred versions and uses thereof, other versions and uses are possible.

Therefore, the spirit and scope of the appended claims should not be limited to the description of the preferred versions contained herein.

What is claimed is:

1. A removable enclosure for a flat bed vehicle comprising:

four upright supports, each upright support enclosing a vertically extendable upper portion, the upright supports located at the corners of a rectangle defined by a load surface of the flat bed vehicle, a rectangular roof of a size approximating the dimensions of the load surface of the flat bed vehicle, each corner of the rectangular roof being attached to an upper end of one of the vertically extendable upper portions, all of the upright supports resting in receiving portions of the trailer bed and being adapted for removable attachment to the trailer bed, the four upright supports being divided into a forward pair of supports and a rear pair of supports, the forward pair of supports being connected by a forward cross brace and having a drive mechanism operable from either forward upright support to raise the upper portion in both forward upright supports and the roof portion attached thereto, the rear pair of supports being connected by a rear cross brace and having a drive mechanism operable from either rear upright support to raise the upper portion in both rear upright supports and the roof portion attached thereto, the drive mechanism in the forward supports operating independently from the drive mechanism in the rear supports.

2. The removable enclosure of claim 1 further including detachable lifting means for lifting the upright supports out of the receiving portions of the trailer bed, said detachable lifting means comprising:

four mounting brackets for attachment to the four uprights, and four bases for attachment to the four mounting brackets, each mounting bracket including extensions spaced to extend horizontally away from the bracket and along opposite sides of an upright, an extension positioned to rest against the bottom of the upright and locking means to hold the bracket to the upright, each base having a vertically extendable shaft, said shaft having means thereon for attachment to the bracket when said bracket is attached to an upright, the base including elevating means for moving the vertically extendable shaft in an upward direction such that when the bracket is attached to the upright and the extendable shaft is attached to the bracket, movement of the elevating means in an upward direction causes the upright to be lifted vertically out of the receiving portion in the trailer bed.

3. The removable enclosure of claim 1 further including a plurality of wheeled supports detachably mounted to each upright support, each wheeled support including elevation means which, when activated, lifts the upright support to which it is attached out of attachment to the trailer bed.

4. The removable enclosure of claim 1 wherein the drive mechanism utilizes a rotatable gear intermeshed with a rack attached to a portion of the upright support.

5. The removable enclosure of claim 1 wherein the drive mechanism utilizes a rotatable threaded shaft, rotation of said shaft causing one end of the roof to lift while maintaining said end parallel to the trailer bed.

* * * * *